(12) United States Patent
Sandell et al.

(10) Patent No.: US 7,599,362 B2
(45) Date of Patent: Oct. 6, 2009

(54) METHOD AND DEVICE FOR COMMUNICATION CHANNEL SELECTION

(75) Inventors: Philip Sandell, Malmö (SE); Lotta Willstedt, Lomma (SE)

(73) Assignee: Sony Ericsson Mobile Communications AB, Lund (SE)

( * ) Notice: Subject to any disclaimer, the term of this patent is extended or adjusted under 35 U.S.C. 154(b) by 387 days.

(21) Appl. No.: 11/164,506

(22) Filed: Nov. 28, 2005

(65) Prior Publication Data

US 2007/0121614 A1 May 31, 2007

(51) Int. Cl.
*H04L 12/56* (2006.01)
(52) U.S. Cl. .................. 370/389; 370/328
(58) Field of Classification Search ........... 455/566, 455/556.2; 709/246; 370/389, 457
See application file for complete search history.

(56) References Cited

U.S. PATENT DOCUMENTS

2005/0172033 A1* 8/2005 Mathew et al. .......... 709/246

2007/0004461 A1* 1/2007 Bathina et al. .......... 455/566

FOREIGN PATENT DOCUMENTS

| EP | 0860972 | 8/1998 |
|----|---------|--------|
| EP | 0946028 | 9/1999 |
| EP | 1104151 | 5/2001 |
| EP | 1394666 | 3/2004 |
| EP | 1603312 | 12/2005 |

* cited by examiner

*Primary Examiner*—Lester Kincaid
*Assistant Examiner*—Phuoc Doan
(74) *Attorney, Agent, or Firm*—Renner, Otto, Boisselle & Sklar LLP

(57) ABSTRACT

A communication terminal and a method for initiating a communication link from a communication terminal to a remote party, where the method includes sensing input of an address number for the remote party. Upon sensing the input of an address number a plurality of selectable items, representing different communication channels usable for setting up a communication link from the terminal, are presented on a display of the terminal. A navigation tool can be used to change selected communication channel, such as from voice call to messaging, after which setting up of a communication link using the selected communication channel can proceed.

49 Claims, 3 Drawing Sheets

METHOD AND DEVICE FOR COMMUNICATION CHANNEL SELECTION

FIELD OF THE INVENTION

The present invention relates to communication terminals capable of using different communication channels for communication with a remote party defined by a communication address, and a method for initiating a communication link to such a remote party. The terminal comprises a user interface, including a display and an input interface, and the terminal is devised to display a selectable set of communication channels responsive to sensing input of a communication number. The invention thereby offers an advantage in terms of handling for users who more or less frequently uses different communication channels for communicating with a certain party, such as both voice dialing and text messaging.

BACKGROUND

Early communication methods and devices where dedicated to one type of communication channel, such as the telegraph and subsequently the telephone. Mobile telephony was originally developed and used for voice dialing. With the second generation of mobile communications, the possibility of sending brief text messages was provided, so called SMS (Short Message Service). SMS enables short messages of generally no more than 140-160 characters in length to be sent and transmitted from a mobile phone, which was introduced in the GSM (Global System for Mobile communications) system and later supported by all other digital-based mobile communications systems. Later, an enhanced transmission service called MMS (Multimedia Messaging Service) was provided, enabling graphics, video clips and sound files to be transmitted via mobile phones. Developed as part of the 3GPP project, MMS phones are generally backward compatible with SMS.

Today, many users of mobile communication systems use their mobile phones for text messaging just as much as for voice dialing. However, the user interfaces of most mobile phones are still configured to be used mainly for dialing, and it takes some maneuvering to initiate a text message when the mobile phone is in a standby mode. Typically, if a telephone number is input by means of the user input interface or fetched from a contact list in the phone, an ordinary speech communication link will be setup upon making a call command. If, on the other hand, the user would like to send a text message, this communication channel has to be selected first.

SUMMARY OF THE INVENTION

An object of the invention is to provide a more efficient solution for initiating a communication session in a communication terminal, capable of communication over a plurality of different communication channels.

A first embodiment of the invention relates to a method for initiating a communication link from a first communication terminal to a second communication terminal, comprising the steps of:
sensing input of an address number in the first communication terminal, representing a communication address for the second communication terminal;
presenting, on a display of the first communication terminal, a plurality of selectable items representing different communication channels, responsive to sensing input of an address number.

An embodiment comprises the step of:
setting up a communication link to the second communication terminal through a selected one of the plurality of communication channels.

An embodiment comprises the step of:
sensing input of a command, selecting one of the communication channels.

An embodiment comprises the step of:
presenting the plurality of selectable items as separate icons.

An embodiment comprises the step of:
sensing the input of a command by detecting operation of a navigation tool of a user input interface of the first communication terminal.

An embodiment comprises the steps of:
presenting an initiate communication option on the display;
setting up the communication link responsive to sensing activation of the initiate communication option.

An embodiment comprises the step of:
presenting the initiate communication option in a format adapted to the selected communication channel.

An embodiment comprises the steps of:
presenting the initiate communication option adjacent to a soft key of a user input interface of the first communication terminal;
setting up the communication link responsive to activation of the soft key.

An embodiment comprises the step of:
indicating the selected communication channel by highlighting the corresponding presented selectable item.

An embodiment comprises the step of:
indicating the selected communication channel by presenting only the corresponding selectable item of the plurality of selectable items, responsive to sensing the input of a command selecting that communication channel.

An embodiment comprises the steps of:
retrieving information about a preset default communication channel;
indicating the default communication channel by initially highlighting the corresponding presented selectable item.

In an embodiment the different communication channels include any two types within the group of: voice call, video call, text messaging, picture messaging and email.

An embodiment comprises the step of:
presenting, when the selected communication channel is a text messaging channel, a text input field on the display.

An embodiment comprises the step of:
presenting, when the selected communication channel is a messaging channel, a get data option selectable to retrieve data from a memory of the first communication terminal and to include the retrieved data in a message addressed to the second communication terminal.

An embodiment comprises the step of:
presenting an add recipient option, selectable to add a communication address for a further communication terminal to which a communication link is to be set up.

An embodiment comprises the steps of:
retrieving information associated with the communication address of the second communication terminal;
presenting the retrieved information on the display.

An embodiment comprises the steps of:
retrieving information related to selectable communication channels usable for communicating with the second communication terminal;

presenting selectable items only for the usable communication channels.

In an embodiment the retrieved information includes identity data of a user of the second communication terminal.

In an embodiment the retrieved information includes a picture of a user of the second communication terminal.

In an embodiment the input address number is the communication address.

In an embodiment the input address number is a speed dial number stored for the communication address.

An embodiment comprises the steps of:
retrieving the communication address from a memory using the input speed dial number;
presenting the communication address on the display.

A second embodiment relates to a communication terminal comprising:
a communication controller including a transceiver device for transmitting signals over a communication link;
a user interface including a display and an input interface;
an input detection device configured to sense input of an address number representing a communication address for a second communication terminal;
a display control device configured to present, on the display, a plurality of selectable items representing different communication channels, responsive to sensing of input of an address number.

In an embodiment the communication controller is configured to set up a communication link to the second communication terminal through a selected one of the plurality of communication channels.

In an embodiment the input detection device is configured to sense input of a command, selecting one of the communication channels.

In an embodiment the display control device is configured to present the plurality of selectable items as separate icons.

In an embodiment the input interface comprises
a navigation tool, and the input detection device is configured to sense the input of a command by detecting operation of the navigation tool.

In an embodiment the display control device is configured to present an initiate communication option on the display, selectable be means of the input interface, wherein the communication setup device is arranged to be triggered to set up a communication link responsive to the input detection device sensing activation of the initiate communication option.

In an embodiment the display control device is configured to present the initiate communication option in a format adapted to the selected communication channel.

In an embodiment the display control device is configured to present the initiate communication option adjacent to a soft key of the user input interface, and wherein the communication setup device is arranged to be triggered to set up a communication link responsive to activation of the soft key.

In an embodiment the display control device is configured to indicate the selected communication channel by highlighting the corresponding presented selectable item on the display.

In an embodiment the display control device is configured to indicate the selected communication channel by presenting only the corresponding selectable item of the plurality of selectable items, responsive to the input detection device sensing the input of a command selecting that communication channel.

In an embodiment the communication terminal comprises
a settings memory, and
a data retrieving mechanism operable to retrieve information stored in the settings memory about a preset default communication channel, wherein the display control device is configured to indicate the default communication by highlighting the corresponding presented selectable item on the display responsive to the input detection device sensing input of an address number.

In an embodiment the different communication channels include any two types within the group of: voice call, video call, text messaging, picture messaging and email.

In an embodiment the display control device is configured to present a text input field on the display, when the selected communication channel is a text messaging channel.

In an embodiment the communication terminal comprises
a message data memory, and
a data retrieving mechanism, wherein the display control device is configured to present a get data option when the selected communication channel is a messaging channel, and wherein the data retrieving mechanism is operable, responsive to the input detection device sensing activation of the get data option, to initiate browsing of the message data memory to include data in a message addressed to the second communication terminal.

In an embodiment the communication terminal comprises
a communication address memory, and
a data retrieving mechanism, wherein the display control device is configured to present an add recipient option, and wherein the data retrieving mechanism is operable, responsive to the input detection device sensing activation of the add recipient option, to initiate browsing of the communication address memory to add a communication address for a further communication terminal to which a communication link is to be set up.

In an embodiment the communication terminal comprises
a communication address memory, and
a data retrieving mechanism, configured to retrieve information associated with the communication address of the second communication terminal and connected to the display control device for presenting the retrieved information on the display.

In an embodiment the data retrieving mechanism is configured to retrieve information related to selectable communication channels usable for communicating with the second communication terminal, and wherein the display control device is configured to present selectable items only for the usable communication channels.

In an embodiment the retrieved information includes identity data of a user of the second communication terminal.

In an embodiment the retrieved information includes a picture of a user of the second communication terminal.

In an embodiment the input address number is the communication address.

In an embodiment, the communication terminal comprises
a speed dial number memory, and
a data retrieving mechanism, configured to retrieve a communication address linked to a speed dial number responsive to input of an address number in the form of that speed dial number.

In an embodiment the display control device is configured to present the communication address linked to the speed dial number on the display.

BRIEF DESCRIPTION OF THE DRAWINGS

The accompanying drawings, which are included to provide further understanding of the invention and are incorporated in and constitute a part of this application, illustrate certain embodiments of the invention. In the drawings.

DETAILED DESCRIPTION OF PREFERRED EMBODIMENTS

Figure 1:
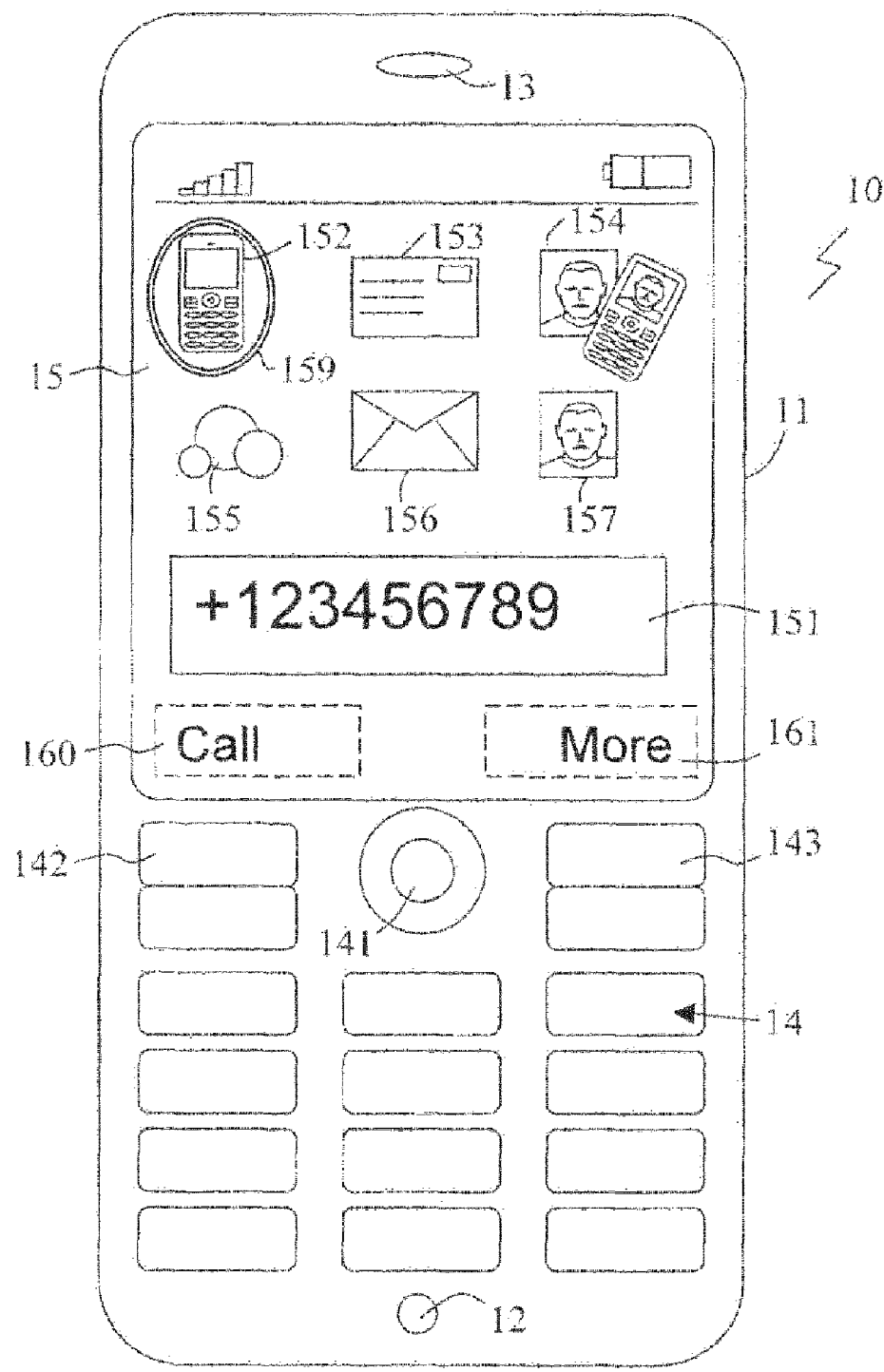
FIG. 1 schematically illustrates a communication terminal with a display and a user input interface, configured to operate in accordance with an embodiment of the invention.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to block diagrams and/or flowchart illustrations of methods, apparatus (systems) and/or computer program products according to embodiments of the invention. It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

FIG. 1 shows an example of a communication terminal in which the present invention may be applied, in this case in the embodiment of a portable communication terminal 10, such as a mobile phone. A basis for the invention is that the communication terminal 10 is capable of communicating through at least two different types of communication channels. The term portable communication terminal includes all mobile equipment devised for radio communication with a radio station, which radio station may also be a mobile terminal or for instance a stationary base station. Consequently, the term portable communication terminal includes any mobile phones, communicators, electronic organizers, smart phones, PDA:s (Personal Digital Assistance), vehicle-mounted radio communication devices or the like as well as portable laptop computers devised for wireless communication in for instance a WLAN (Wireless Local Area Network). It should also be noted that the invention is, as such, in no way related to the portability of the communication terminal, nor that the terminal is devised for wireless communication. The communication terminal may thus be a stationary wire-connected communication terminal, capable of communicating through at least two different types of communication channels.

The terminal 10 of FIG. 1 comprises a chassis or housing 11, carrying a user audio input in the form of a microphone 12 and a user audio output in the form of a speaker 13 or a connection to an ear piece (not shown). A set of keys, buttons or the like constitutes an input interface 14, usable for instance for dialing according to the established art. A data output interface comprises a display 15 devised to present communication information to a terminal user, preferably by use of a graphical user interface. The terminal further includes radio transmitter and receiver means and an antenna (not shown) for conveying radio signals. In order to provide power to the terminal, a battery (not shown) is either included in or releasably attachable to the terminal 10. FIG. 1 illustrates the most traditional type of mobile phones, which is in one piece and has physical keys in the input interface 14. Alternative solutions, which may also be used in a terminal devised in accordance with the present invention, includes clamshell type phones, jack knife phones, phones with slide covers or flip-up covers, and so on. Furthermore, the input interface 14 may comprise a touch-sensitive display, such as display 15.

As mentioned, mobile phones were originally developed to support phone calls, and that was it. Over time more and more functions have been built in to the devices and today a mobile phone can support a number of other tasks than just phone calls. But still today phone call is the main functionality of a mobile phone, and it will probably remain so for a period of time. The focus on the function "phone call" is therefore obvious when start typing numbers on a mobile phone, and the only function available is to call that dialled number. However, other communication channels except phone calls are used heavily by the users, for example sending text messages.

The present invention is built on the fact that other communication channels in some situations might be as important as phone call, and hence should be easily accessible from the mobile phone's standby screen. In the standby screen of many mobile phones of today, the only function that the user is offered is to call the typed number. To initiate a communication link through another communication channel with a contact or number, the user will have to navigate to desired function, such as SMS, MMS, Instant messaging, email etc, or select a number from the contact list and select a function from there. With this state of the art solution the user is forced to either populate the contact list or use the wizard style UI where the user for example first types the message then enters an address number for the recipient.

According to an embodiment of the invention, all registered communication channels in the communication terminal are presented in combination with the number input in Standby screen. Once the user starts to type numbers the different communications channels are presented and will be selectable. The user will, in addition to initiating a phone call, be able to initiate e.g. a text message, email, video call, an instant messaging session etc, directly after typing the phone number. The communication channels are presented as selectable items, e.g. in the form of separate text portions, or even more preferred as individual icons, one for each communication channel. Preferably, a default channel is preset, such as normal phone call. When typing of an address number is sensed the selectable items are then presented, of which the default channel is pre-selected. If a user generally prefers another communication channel than the default channel, which may be normal phone call, the default channel can be changed, e.g. to video call or text messaging.

Figure 6:
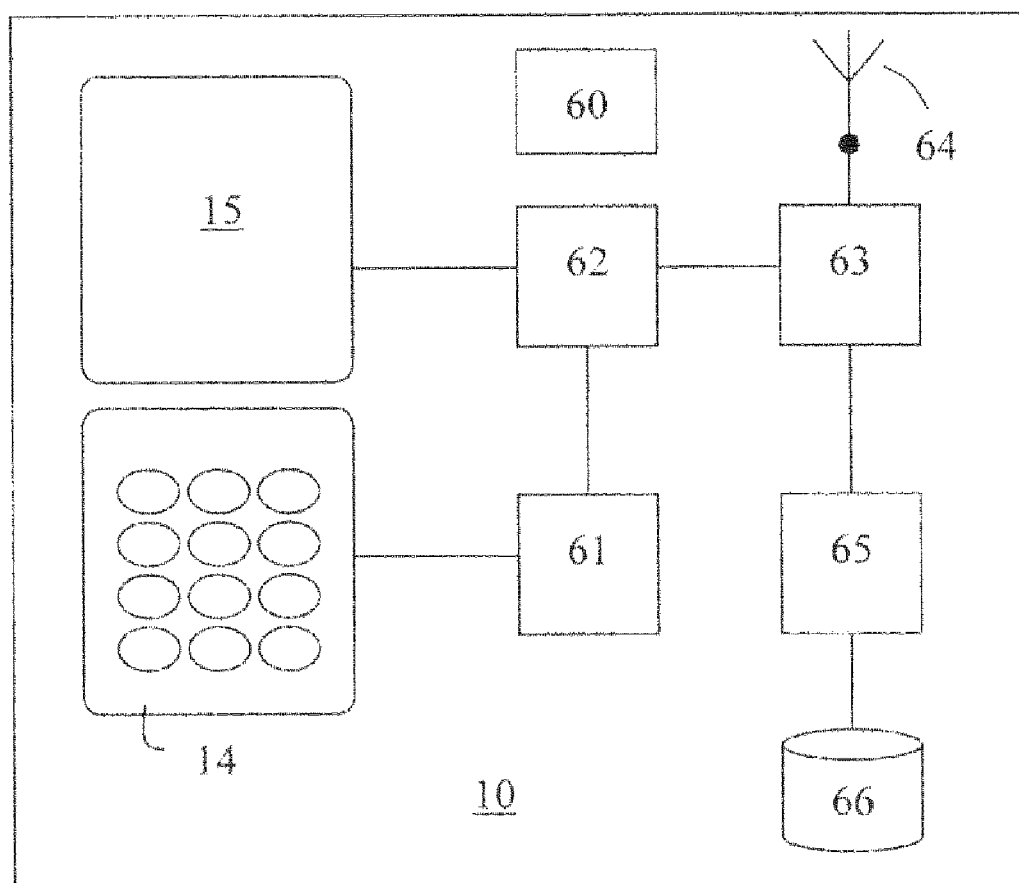
FIG. 6 schematically illustrates a block diagram representing a communication terminal configured in accordance with an embodiment of the invention.

FIG. 1 illustrates visual parts of a terminal 10, whereas FIG. 6 illustrates functional elements of terminal 10 arranged as a block diagram. It should be noted that these functional elements need not be physically divided in the way indicated in FIG. 6, and that the block diagram of FIG. 6 is meant to more clearly illustrate the functional steps carried out in the terminal.

In FIG. 6, a control unit 60 is schematically illustrated in terminal 10. Control unit 60 preferably includes a microprocessor with associated memory space, operation system and application software, and is operable to handle communication and data transfer between subunits within the terminal. An input detection device 61 is connected to input interface 14, and configured to sense input of an address number. An address number may be input using input interface 14 to type the number, or by fetching the number in a contact list stored in the terminal using e.g. a navigation tool 141 of the input interface. A display control device 62 is provided to display information and images on display 15, by means of a graphical user interface. Furthermore, display control device 62 is responsive to present information on display 15 responsive to the input detection device 61 sensing input of an address number, as will be explained. A communication controller 63 includes a transceiver device for transmitting and possibly receiving communication signals through a communication interface. In the presented embodiment, in which terminal 10 is a mobile phone, communication controller 63 includes digital signal coding and encoding means and a radio transceiver, and is operable to communicate with other parties by radio using an antenna 64. Alternative solutions make use of a wire-bound communication interface and electric signals rather than radio. Transmitted and received signals may be circuit-switched or packet-switched. Communication controller 63 is thus operable to e.g. initiate a call, or to send a message. A data retrieving mechanism 65 is operable to browse or retrieve data from a memory 66. The data retrieving mechanism 65 and memory 66 will be referred to in general terms below for different type of data, but it should be understood that different elements, software and data memories may be used for different types of stored data.

Function of a communication terminal 10 arranged in accordance with the invention will now be described by reference to FIGS. 1-6.

In FIG. 1, a user has input an address number in the form of a telephone number +123456789, either using input interface 14 to type the number or by fetching the number in a contact list stored in the terminal. The input address number is presented in a typing frame 151 on display 15. Upon input of the address number, display control device 62 is configured to present, on display 15, selectable items 152-157 representing a plurality of different communication channels. Selectable items 152-157 are merely examples, and represent phone call 152, text message 153, video call 154, instant messaging 155, email 156, and MMS 157. Preferably, and as illustrated, the selectable items are presented as icons, designed to visually indicate the communication channel they represent. Additionally, a written explanation 158 may be presented for a currently marked item. An alternative solution is to present all selectable items in clear text, e.g. in a column. In a preferred embodiment, the selectable items are presented as soon as a first character is typed. In another embodiment, the selectable items are presented only after a full number has been typed. It may be noted that not all communication channels shown in FIG. 1 are by necessity usable by means of one and the same address number, but at least voice call 152, text messaging, such as SMS, 153, video call 154 and MMS 157, can all be setup using a telephone number to a mobile phone capable of handling these services. In one embodiment, all registered communication channels usable within terminal 10 are presented on display 15. In another embodiment, data retrieving mechanism 65 is configured to enter a contact list stored in memory 66, using the input address number, and thereby retrieve information about which communication channels are usable for communicating with a recipient having the input address number. This way, it may be possible to type a persons phone number, upon which terminal 10 recognizes that phone number and establishes that there is also e.g. an email number linked to that contact. In that case the email item 156 is also presented. If no email address is found tied to that contact, the display control device 62 may be configured not to present the email item 157.

One embodiment of the invention therefore relates to a communication terminal 10 comprising a transceiver device 63 for transmitting signals over a communication link, a user interface including a display 15 and an input interface 14, and an input detection device 61 configured to sense input of an address number representing a communication address for a second communication terminal, characterized in that a display control device 62 is connected to the input detection device, and configured to present a plurality of selectable items 152-157 representing different communication channels on the display, responsive to sensing of input of an address number.

FIG. 1 illustrates a default setting, according to an embodiment of the invention. In this default setting, voice call 152 is preset to be the first choice of communication channel. Consequently, as the selectable items 152-157 are presented upon input of the address number, a selection indicator 159 clearly highlights selectable item 125. In the illustrated embodiment, selection indicator 159 is a frame encompassing the presently selected item. Alternative solutions may be to fade the presently not selected items, to enlarge the selected item compared to the other items, or a combination of these effects. Yet another alternative is to present only the presently selected item, whereupon operation of navigation key 141 another of the selectable items will show.

Since voice call is the pre-selected default setting, a voice call communication link to the input address number can be setup by an initiate communication option command, in this case a call command. In FIG. 1 this is exemplified by a softkey button 142 of the input interface, linked to a softkey field 160 on display 15. In the drawings, softkey field 160 is indicated by a dashed frame merely to indicate the presence of the field, whereas in a real embodiment only the text given in the softkey field 160 will generally be visible, not any border frame. As voice call is presently selected in FIG. 1, softkey field 160 states "Call". Activation of the softkey button 142 will then trigger the call. However, if the user wishes to use another communication channel, another selectable item 153-157 representing that channel is selected. This is typically performed by using a navigation tool 141 of the input interface 14, such as a joystick, a jog ball, a set of arrow keys, or the like.

Figure 2:
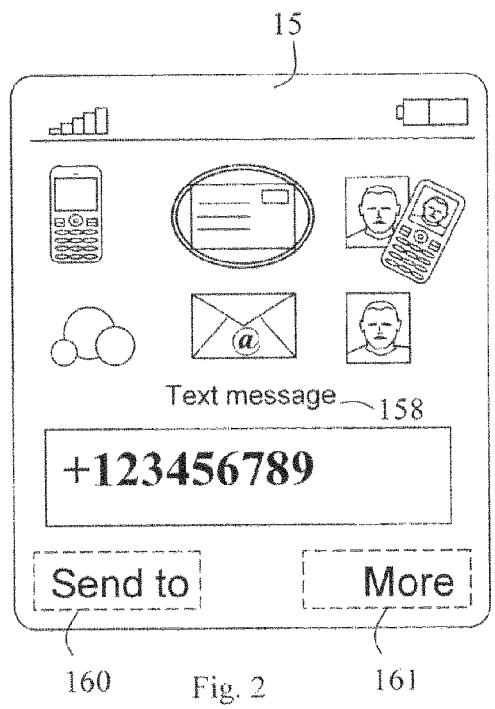
FIG. 2 illustrates the display of the terminal of FIG. 1, after selection of communication channel in accordance with an embodiment of the invention.

In FIG. 2 the user has operated the navigation tool 141 to instead select text messaging. In one embodiment, as shown in FIG. 2, a clear text explanation 158 is also given on display 15 for the presently selected communication channel. Upon operation of navigation tool 141 to move selection indicator 159 to selection item 153, the text given in softkey field 160 preferably also changes character, from "Call" to "Send to". An alternative wording to be used for softkey field 160 could be "Write to", since at this point no real text message has been entered. Therefore, activation of softkey button 142 preferably triggers presentation of a text input field on display 15. An alternative way to proceed from FIG. 2 may be to activate a get data option using another presented selectable item on display 15. In FIG. 2 this is illustrated by a right softkey field 161 with associated softkey button 143. As for softkey field 160, the border frame around softkey field 161 is merely shown in the drawings to indicate its presence. Softkey field 161 presents a text message "More", activation of which may present a number of different options according to the established art. In one embodiment, an option under "More" may be to retrieve stored message data from a memory 66 using data retrieving mechanism 65, for including the retrieved data in a message addressed to the input address number. This way a message forwarding function is provided. Preferably, the retrieved message data can also be changed before sending. Another usable feature is to present an add recipient option on display 15, selectable to add a communication address for further recipients to which a communication link is to be set up. For text messaging, a retrieved or input text message can this way be transmitted to plural recipients. Typically, such an add recipient option may also be selectable from a menu presented upon activating the "More" softkey, whereupon data retrieving mechanism 65 is triggered to present a contact list stored in memory 66, from which further recipient address numbers may be selected. A corresponding arrangement regarding retrieving stored data and stored address numbers can be made for MMS and for emails, where retrieval of previous data for sending to another communication terminal, and sending of data to plural recipients, may be of interest.

After retrieving or inputting text data, or other types of more advanced data such as images, sound files or video clips in the case of MMS or email, the communication link is setup by activation of the initiate communication option, i.e. the "Send to" softkey.

Figure 3:
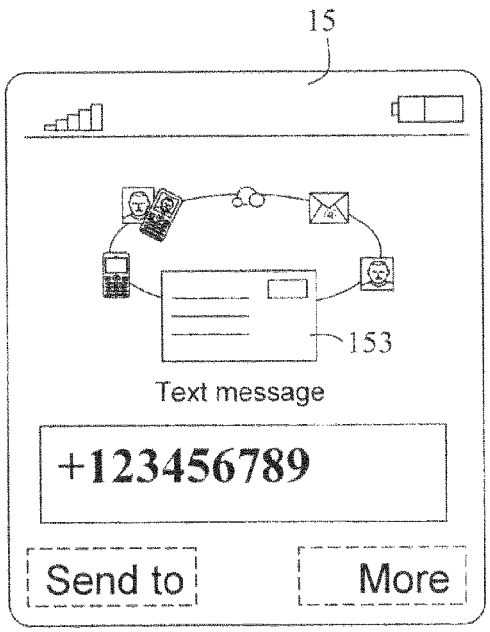
FIG. 3 illustrates an alternative layout of the display of the terminal of FIG. 1, in accordance with an embodiment of the invention.

FIG. 3 schematically illustrates an alternative layout for the selectable items 152-157 on display 15, arranged in a rotatable circle. Operation of navigation tool 141 to the right or left will rotate the circularly arranged items 152-157, such that the foremost, text message in FIG. 3, is illustrated as selected. As before, a selection indicator may also be employed in the form of a frame, and/or a clear text explanation 158 may be provided, to more clearly show which communication channel is presently selected.

Figure 4:
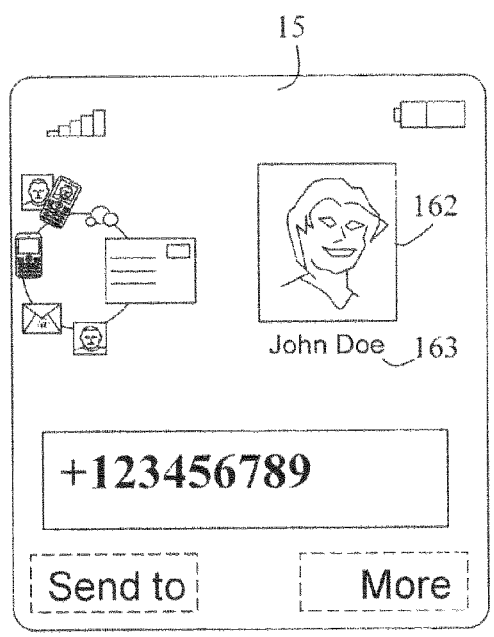
FIG. 4 illustrates the display of the terminal of FIG. 1, further devised to present information associated with an input address number in accordance with an embodiment of the invention.

FIG. 4 illustrates yet another embodiment of the invention, in which input of an address number which is already present in a contact list in memory 66 also involves retrieving an image 162 and/or an identity 163 for a user defined by the address number in question. The data for the user is retrieved by data retrieving mechanism 65 from memory 66, and is presented on display 15. As mentioned above, sensing that the input address number is already present in a stored contact list may also involve presenting selectable items 152-157 only related to communication channels usable for setting up a communication link to the recipient in question. As an example, an address number in the form of a telephone number is input by typing. The number is recognized using data retrieving mechanism, which transparently checks the stored contact list. An email address linked to a user having the input telephone number is thereby found, whereupon the email item 156 is shown on display 15 along with the other items usable for setting up a communication link to the telephone number in question. If navigation tool 141 is operated to select the email item 156, the address number in field 151 may in one embodiment change to show the retrieved email address from the contact list.

Figure 5:
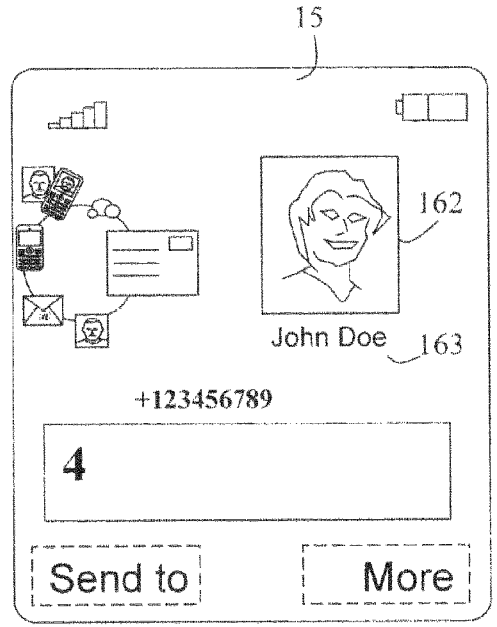
FIG. 5 illustrates the display of the terminal of FIG. 1, further devised to present communication address information upon input of a speed dial number in accordance with an embodiment of the invention.

FIG. 5 illustrates another embodiment of the invention, in which a speed dial function is programmed into the terminal. If a single character address number, 4 is this case, is input by typing and no new character is input for a predetermined period, data retrieving mechanism 65 is devised to check for a corresponding speed dial number in a speed dial number memory 66, and to retrieve a communication address stored in memory 66. In the example of FIG. 5, the corresponding communication address, in this case a telephone number, is thereby presented in clear text on display 15. At the same time, data related to a user associated with the input speed dial number is retrieved and displayed, in the same manner as for the embodiment of FIG. 4.

The present invention has been described by means of examples in terms of functional steps and different layouts for realizing the invention in various embodiments. The basic idea behind the invention, common for the described embodiments, is to provide a tool for users where communication channel can be easily selected before setting up a communication link. The invention therefore provides a scheme for initiating a communication link comprising two basic steps.

In a first step an address number is input. The address number may be a true communication address or a number linked to a communication address which can be recognized as such by the terminal, such as a speed dial number. Another variant is for the terminal software to, upon sensing typing of a number, check for communication addresses starting with those numbers and fill in the typing field 151 automatically, comparable to the state of the art T9 function for text input. Yet another example is to input letters corresponding to a stored title in a contact list, rather than numbers of an address number. Such an embodiment, preferably configured to also sense and recognize numbers, may be used for terminals with more advanced input interfaces than standard mobile phones, with letter key in addition to number keys, such as a pocket computer or a PDA.

When it is sensed that an address number is input, selection items are presented on the terminal display, for selecting which type of communication channel to use for setting up a communication link. This is particularly beneficial when different types of communication channels are frequently used for communicating from the same terminal, and a typical scenario is a mobile phone used for both voice calls and for SMS and MMS. Using a navigation tool, the communication channel of interest can be selected, after which the communication link can be set up. For a voice call or video call, the setting up of the communication link involves calling the communication address number in question. For messaging, the setting up of a communication link will include entering message data and sending the data to the communication address in question.

The invention thereby provides a straightforward way of communicating using a terminal capable of handling different communication channels, where handling of the communication link setup process is streamlined to first focus on choice of recipient and then on choice of communication channel by simple selection. Various modifications of the embodiments described herein are foreseeable, whereas the scope of the invention is defined by the appended claims.

What is claimed is:

1. A method for initiating a communication link from a first communication terminal to a second communication terminal, comprising the steps of:
  sensing input of an address number in the first communication terminal, representing a communication address for the second communication terminal;
  retrieving information associated with the communication address of the second communication terminal;
  presenting the retrieved information on a display of the first communication terminal;
  retrieving information related to selectable communication channels usable for communication with second communication terminal;
  presenting, on a display of the first communication terminal, a plurality of selectable items only representing the usable communication channels, responsive to sensing input of an address number;
  setting up a communication link to the second communication terminal through a selected one of the plurality of usable communication channels; and
  presenting, when the selected communication channel is a messaging channel, a get data option selectable to retrieve data from a memory of the first communication terminal and to include the retrieved data in a message addressed to the second communication terminal.

2. The method according to claim 1, comprising the step of:
  sensing input of a command, selecting one of the communication channels.

3. The method according to claim 1, comprising the step of:
  presenting the plurality of selectable items as separate icons.

4. The method according to claim 2, comprising the step of:
  sensing the input of a command by detecting operation of a navigation tool of a user input interface of the first communication terminal.

5. The method according to claim 1, comprising the steps of:
  presenting an initiate communication option on the display;
  setting up the communication link responsive to sensing activation of the initiate communication option.

6. The method according to claim 5, comprising the step of presenting the initiate communication option in a format adapted to the selected communication channel.

7. The method according to claim 5, comprising the steps of
  presenting the initiate communication option adjacent to a soft key of a user input interface of the first communication terminal;
  setting up the communication link responsive to activation of the soft key.

8. The method according to claim 1, comprising the step of:
  indicating the selected communication channel by highlighting the corresponding presented selectable item.

9. The method according to claim 2, comprising the step of:
  indicating the selected communication channel by presenting only the corresponding selectable item of the plurality of selectable items, responsive to sensing the input of a command selecting that communication channel.

10. The method according to claim 1, comprising the steps of:
  retrieving information about a preset default communication channel;
  indicating the default communication channel by initially highlighting the corresponding presented selectable item.

11. The method according to claim 1, wherein the communication channels include any two types within the group of: voice call, video call, text messaging, picture messaging and email.

12. The method according to claim 1, comprising the step of:

presenting, when the selected communication channel is a text messaging channel, a text input field on the display.

13. The method according to claim 1, comprising the step of:
presenting an add recipient option, selectable to add a communication address for a further communication terminal to which a communication link is to be set up.

14. The method according to claim 1, wherein the retrieved information includes identity data of a user of the second communication terminal.

15. The method according to claim 1, wherein the retrieved information includes a picture of a user of the second communication terminal.

16. The method according to claim 1, wherein the input address number is the communication address.

17. The method according to claim 1, wherein the input address number is a speed dial number stored for the communication address.

18. The method according to claim 17, comprising the steps of:
retrieving the communication address from a memory using the input speed dial number;
presenting the communication address on the display.

19. A communication terminal comprising:
a communication controller including a transceiver device for transmitting signals over a communication link;
a user interface including a display and an input interface;
an input detection device configured to sense input of an address number representing a communication address for a second communication terminal;
a communication address memory;
a message data memory: and
a data retrieving mechanism, configured to retrieve information associated with the communication address of the second communication terminal and connected to a display control device for presenting the retrieved information on the display; and wherein
the data retrieving mechanism is configured to retrieve information related to selectable communication channels usable for communicating with the second communication terminal;
the display control device configured to present, on the display, a plurality of selectable items only representing the usable communication channels, responsive to sensing of input of the address number;
the communication controller is configured to set up a communication link to the second communication terminal through a selected one of the plurality of usable communication channels ;and
the display control device is configured to present a get data option when the selected communication channel is a messaging channel, and wherein the data retrieving mechanism is operable, responsive to the input detection device sensing activation of the get data option, to initiate browsing of the message data memory to include data in a message addressed to the second communication terminal.

20. The communication terminal according to claim 19, wherein the input detection device is configured to sense input of a command, selecting one of the communication channels.

21. The communication terminal according to claim 19, wherein the display control device is configured to present the plurality of selectable items as separate icons.

22. The communication terminal according to claim 20, wherein the input interface comprises a navigation tool and the input detection device is configured to sense the input of a command by detecting operation of the navigation tool.

23. The communication terminal according to claim 19, wherein the display control device is configured to present an initiate communication option on the display, selectable be means of the input interface, wherein the communication setup device is arranged to be triggered to set up a communication link responsive to the input detection device sensing activation of the initiate communication option.

24. The communication terminal according to claim 23, wherein the display control device is configured to present the initiate communication option in a format adapted to the selected communication channel.

25. The communication terminal according to claim 23, wherein the display control device is configured to present the initiate communication option adjacent to a soft key of the user input interface, and wherein the communication setup device is arranged to be triggered to set up a communication link responsive to activation of the soft key.

26. The communication terminal according to claim 19, wherein the display control device is configured to indicate the selected communication channel by highlighting the corresponding presented selectable item on the display.

27. The communication terminal according to claim 20, wherein the display control device is configured to indicate the selected communication channel by presenting only the corresponding selectable item of the plurality of selectable items, responsive to the input detection device sensing the input of a command selecting that communication channel.

28. The communication terminal according to claim 19, comprising
a settings memory, and
a data retrieving mechanism operable to retrieve information stored in the settings memory about a preset default communication channel, wherein the display control device is configured to indicate the default communication by highlighting the corresponding presented selectable item on the display responsive to the input detection device sensing input of an address number.

29. The communication terminal according to claim 19, wherein the communication channels include any two types within the group of: voice call, video call, text messaging, picture messaging and email.

30. The communication terminal according to claim 19, wherein the display control device is configured to present a text input field on the display, when the selected communication channel is a text messaging channel.

31. The communication terminal according to claim 19, comprising
a communication address memory, and
a data retrieving mechanism, wherein the display control device is configured to present an add recipient option, and wherein the data retrieving mechanism is operable, responsive to the input detection device sensing activation of the add recipient option, to initiate browsing of the communication address memory to add a communication address for a further communication terminal to which a communication link is to be set up.

32. The communication terminal according to claim 19, wherein the retrieved information includes identity data of a user of the second communication terminal.

33. The communication terminal according to claim 19, wherein the retrieved information includes a picture of a user of the second communication terminal.

34. The communication terminal according to claim 19, wherein the input address number is the communication address.

35. The communication terminal according to claim 19, comprising
- a speed dial number memory, and
- a data retrieving mechanism, configured to retrieve a communication address linked to a speed dial number responsive to input of an address number in the form of that speed dial number.

36. The communication terminal according to claim 35, wherein the display control device is configured to present the communication address linked to the speed dial number on the display.

37. A method for initiating a communication link from a first communication terminal to a second communication terminal, comprising the steps of:
- sensing input of letters in the first communication terminal, representing a title for the second communication terminal;
- retrieving information associated with the title of the second communication terminal;
- presenting the retrieved information on a display of the first communication terminal;
- retrieving information related to selectable communication channels usable for communication with second communication terminal;
- presenting, on a display of the first communication terminal, a plurality of selectable items only representing the usable communication channels, responsive to sensing input of the title;
- setting up a communication link to the second communication terminal through a selected one of the plurality of usable communication channels; and
- presenting, when the selected communication channel is a messaging channel, a get data option selectable to retrieve data from a memory of the first communication terminal and to include the retrieved data in a message addressed to the second communication terminal.

38. The method according to claim 37, comprising the step of:
- sensing input of a command, selecting one of the communication channels.

39. The method according to claim 37, comprising the step of:
- presenting the plurality of selectable items as separate icons.

40. The method according to claim 37, wherein the communication channels include any two types within the group of: voice call, video call, text messaging, picture messaging and email.

41. The method according to claim 37, wherein the retrieved information includes identity data of a user of the second communication terminal.

42. The method according to claim 37, wherein the retrieved information includes a picture of a user of the second communication terminal.

43. A communication terminal comprising:
- a communication controller including a transceiver device for transmitting signals over a communication link;
- a user interface including a display and an input interface;
- an input detection device configured to sense input of letters representing a title for a second communication terminal;
- a title memory;
- a message data memory: and
- a data retrieving mechanism, configured to retrieve information associated with the title of the second communication terminal and connected to a display control device for presenting the retrieved information on the display; and wherein
  - the data retrieving mechanism is configured to retrieve information related to selectable communication channels usable for communicating with the second communication terminal;
  - the display control device configured to present, on the display, a plurality of selectable items only representing the usable communication channels, responsive to sensing of input of the title;
  - the communication controller is configured to set up a communication link to the second communication terminal through a selected one of the plurality of usable communication; and
  - the display control device is configured to present a get data option when the selected communication channel is a messaging channel, and wherein the data retrieving mechanism is operable, responsive to the input detection device sensing activation of the get data option, to initiate browsing of the message data memory to include data in a message addressed to the second communication terminal.

44. The communication terminal according to claim 43, wherein the input detection device is configured to sense input of a command, selecting one of the communication channels.

45. The communication terminal according to claim 43, wherein the display control device is configured to present the plurality of selectable items as separate icons.

46. The communication terminal according to claim 43, wherein the communication channels include any two types within the group of: voice call, video call, text messaging, picture messaging and email.

47. The communication terminal according to claim 43, wherein the retrieved information includes identity data of a user of the second communication terminal.

48. The communication terminal according to claim 43, wherein the retrieved information includes a picture of a user of the second communication terminal.

49. The communication terminal according to claim 43, comprising
- a speed dial letter memory, and
- a data retrieving mechanism, configured to retrieve a title linked to a speed dial letter responsive to input of a letter in the form of that speed dial letter.

* * * * *

UNITED STATES PATENT AND TRADEMARK OFFICE
CERTIFICATE OF CORRECTION

PATENT NO.      : 7,599,362 B2                                                Page 1 of 1
APPLICATION NO. : 11/164506
DATED           : October 6, 2009
INVENTOR(S)     : Sandell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 404 days.

Signed and Sealed this

Twenty-eighth Day of September, 2010

David J. Kappos
*Director of the United States Patent and Trademark Office*